US005098580A

United States Patent [19]

Andersen

[11] Patent Number: 5,098,580

[45] Date of Patent: Mar. 24, 1992

[54] METHOD AND SYSTEM FOR RECEIVING AND HANDLING POLLUTED LIQUIDS, ESPECIALLY STRATIFIED OIL PRODUCTS IN PETROL AND OIL TANKS

[76] Inventor: Arne Andersen, Kådhøjvej 4A, DK-8530 Hjortshøj, Denmark

[21] Appl. No.: 434,908

[22] Filed: Oct. 27, 1989

Related U.S. Application Data

[63] Continuation of Ser. No. 210,516, Jun. 20, 1988, abandoned.

[30] Foreign Application Priority Data

Oct. 21, 1986 [DK] Denmark ............ 5035/86

[51] Int. Cl.[5] ............ B01D 21/32; C10G 33/06; C10G 33/08; C10M 175/00

[52] U.S. Cl. ............ 210/745; 15/246.5; 134/21; 134/186; 137/15; 137/566; 137/568; 196/46; 208/179; 208/187; 210/87; 210/94; 210/241; 210/257.1; 210/258; 210/524; 210/803

[58] Field of Search ............ 210/94, 95, 96.1, 167, 210/241, 406, 416.5, 523, 709, 712, 745, 799, 803, 805, 87, 258, 739, 767; 208/179, 187; 134/24, 186, 21, 34; 196/46, 46.1; 137/15, 565, 568

[56] References Cited

U.S. PATENT DOCUMENTS

| | | | |
|---|---|---|---|
| 1,962,463 | 6/1934 | Renfrew | 210/241 |
| 2,425,848 | 8/1947 | Vawter | 210/241 |
| 3,586,169 | 6/1971 | Holtquist | 210/241 |
| 3,954,611 | 5/1976 | Reedy | 210/241 |
| 4,153,553 | 5/1979 | Davis | 210/95 |
| 4,179,019 | 12/1979 | Danziger | 208/179 |
| 4,360,436 | 11/1982 | Poveromo | 210/799 |
| 4,721,127 | 1/1988 | Conlin | 134/21 |
| 4,784,751 | 11/1988 | McGehee | 208/187 |

*Primary Examiner*—Robert A. Dawson
*Assistant Examiner*—Joseph Drodge
*Attorney, Agent, or Firm*—Antonelli, Terry Stout & Kraus

[57] ABSTRACT

A method and system for handling polluted liquids with a mobile sewage vehicle, especially stratified oil products in a petrol or oil tank wherein the contents of the tank normally separates into horizontal layers of useless polluted liquid and fully useable liquid, respectively. The fractions of the polluted and useable liquid are respectively drawn into a sludge tank and an extra tank so that the extra tank receives an immediately reuseable product which may be returned to the petrol or oil tank. The selective filling of the sludge tank and extra tank is obtained by providing an arrangement for enabling an inspection of the suctioned liquid as the suctioned liquid enters the sludge tank and a valve device for facilitating the necessary switching operations.

6 Claims, 1 Drawing Sheet

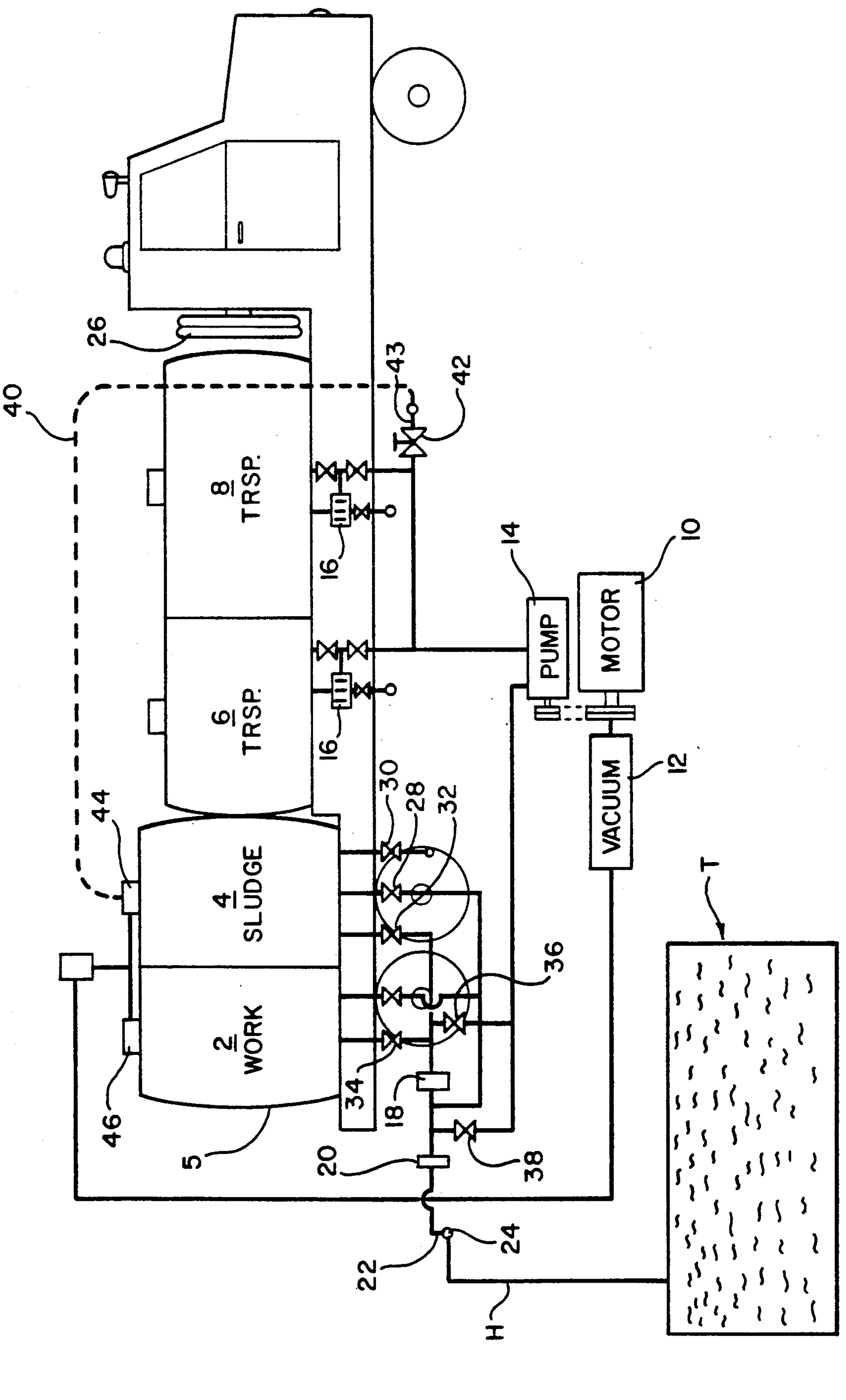
2
WORK
4
SLUDGE
6
TRSP.
8
TRSP.
PUMP
MOTOR
VACUUM
T
H
5
10
12
14
16
16
18
20
22
24
26
28
30
32
34
36
38
40
42
43
44
46

METHOD AND SYSTEM FOR RECEIVING AND HANDLING POLLUTED LIQUIDS, ESPECIALLY STRATIFIED OIL PRODUCTS IN PETROL AND OIL TANKS

This is a continuation of application Ser. No. 210,516, filed June 20, 1988 now abandoned.

BACKGROUND OF THE INVENTION

The present invention relates to a method and system for collecting and handling polluted oil products and petrol and oil tanks.

In many instances, it may happen that the contents of tanks such as, for example, oil storage tanks may accidentally or otherwise become polluted. Consequently, care must be taken when the tank is emptied by the sewage truck, which truck subsequently delivers the contents of the tank to a treatment plant.

While it is possible to a certain extent to separate the impurities from the oil and usefully recycle the same into a pure oil product at a treatment plant, a considerable amount of unnecessary work has already been carried out prior to reaching the treatment plant by virtue of the transportation of the entire contents of the tank to the treatment plant.

The aim underlying the present invention essentially resides in providing a method and system for collecting and handling polluted oil products whereby it is possible to decide at the tank location whether the liquid drawn from a storage tank is immediately reuseable since most pollutants such as, for example, water, introduced into an oil product, are revealed by a stratification of the tank contents whereby, during a suctioning operation wherein the contents of the storage tank are drawn therefrom, it is possible to ascertain whether the suctioned material consists of a useful liquid or a polluted liquid. Thus, rather than simply collect all of the liquid in the sewage tank, it is thus possible in accordance with the present invention, during an actual suctioning operation to observe the nature of the suctioned product and thereby to selectively lead the suctioned liquid to a tank for polluted liquid and/or a tank for non-polluted liquid, respectively. Upon suctioning or pumping up all liquid from the tank, the usable liquid portion can be immediately returned to the tank and only the polluted portion of the liquid can be transported to the treatment plant.

Often a polluted portion of the liquid represents a relatively small quantity of the suctioned liquid, so that the total transport capacity necessary for the polluted portion of the liquid can be drastically reduced by, for example, postponing the transportation to distant treatment plants until only the decidedly polluted liquid has been accumulated from a number of locations in a given region Additionally, by virtue of the features of the present invention, the user of a tank system, the contents of which may have been exposed to pollution, realizes a significant advantage in that the tank contents are not completely removed since the reuseable portion of the liquid can be returned to the tank immediately upon an isolation of the polluted liquid from the sewage tank.

The aim underlying the present invention essentially resides in providing a method and system for handling polluted products such as oil products, whereby it is possible at the inception of the suctioning or drawing operation of the tank contents to distinguish between pure and polluted liquid and thus obtain a pure portion of the liquid for immediate reuse; whereas, only the actually polluted liquid portion is accumulated for transportation to a regional treatment plant.

In accordance with the present invention, a mobile sewage unit is provided which includes, for example, a sewage tank and a working tank, and, during a suctioning or drawing operation, the suctioned or drawn product is examined and fed to the sewage tank of the mobile sewage unit as long as the suctioned or drawn product is polluted and to a working tank when the product is pure, whereupon, the pure product is returned from the working tank to the emptied tank and the separated portion of the product in the sewage tank is transported to the treatment plant. Thus, it is possible in accordance with the present invention to more economically carry out a reclaiming or recycling of a usable portion of the liquid product.

In order to carry out the method of the present invention, a sewage vehicle is provided with an extra working tank and one or more transportation tanks for transporting pure products. A variety of jobs normally associated with the sewage handling such as, for example, tank flushing can more conveniently be carried out than in prior art arrangements, as will be apparent from the following description, when the mobile sewage system includes a suction and transfer pumping gear arrangement.

BRIEF DESCRIPTION OF THE FIGURE

The single figure of the drawing is a schematic view of a mobile sewage system constructed in accordance with the present invention.

DETAILED DESCRIPTION

As shown in the single figure of the drawings, the system of the present invention includes, for example, four tanks, namely, a working tank 2, a sludge tank 4, and two transportation tanks 6, 8. The tanks 2, 4, 6 and 8 and other associated equipment are placed, on a truck chassis whereby the system forms a specialized tank truck. In addition to valves and pipe connections, described more fully hereinbelow, the equipment also includes a motor 10, a vacuum pump 12, a gear or so-called liquid transfer pump 14, two flow gauges 16,16, a filter 18 and a liquid indicator 20, with the liquid indicator 20 being placed in a suction pipe 22 terminating in a suction pipe stub 24. The truck is also provided with necessary hose equipment, so that the required suctioning or drawing operations can be carried out from the pipe stub 24.

Additional equipment such a various hose pieces and, advantageously, a long roller hose 26 are disposed, for example, behind the cab of the truck. The transportation tanks 2, 4 are provided with easily cleanable gauge glasses 5. For carrying out an ordinary sewage suction operation, that is, a suction operation where it is known in advance that all liquid is sludge or otherwise polluted, the vacuum pump 12 is operated to suction or draw out the liquid to the sludge tank through the pipe stub 24 and valve 28 whereby the liquid only passes the liquid indicator 20. Upon removal, the sludge is emptied through a bottom valve 30 by pressurizing the sludge tank 4.

If it is necessary to further inspect the sludge at the site, at least a portion of the suction operation can be carried out through a valve 32, whereby the sludge passes the filter 18.

The filter 18 is easily dismantable and after a predetermined amount of time, a solid specimen can be removed from the filter 18 for testing or examination If the designated task is to collect a quantity or tankful or entirely pure liquid from, for example, an underground tank, a large volume of the liquid can be drawn or suctioned into the working tank 2 through a valve 34 by producing a vacuum in the working tank 2. When the working tank 2 is completely or almost completely full, the suction operation is stopped and the liquid is transferred to one of the transportation tanks 6, 8 by the transfer pump 14 through the valves 34, 36, whereby the transportation tank 6 or 8 is filled through the flow gauge 16, that is, the quantity collected can be measured and optionally billed at the site.

A suctioning operation could also be effected solely by operation of the pump 14, for example, through a feeding valve 38 from the pipe stub 24, but toward an end of the suctioning operation, air inevitably enters the suction hose, causing the pumping effect to decrease drastically. Therefore, at least the final phase of the suctioning operation must be effected to the working tank 2 applying a vacuum cleaning-like effect of the vacuum pump 12. It is unattainable and absolutely impossible to guarantee the vital point that a suctioned liquid with a possible content of air, which from the transfer pump 14 is pressurized along the transportation tank 6 or 8, can provide a precise flow meter reading since this must apply to the liquid and not the air content. However, this probably can be overcome by utilizing the working tank 2 as a temporary collecting container.

If polluted liquid has to be processed from a tank T that is known or suspected to contain stratified liquid of pure and polluted liquid, the invention facilitates a practical possibility for a suctioning the tank T to the sludge tank 4 and the pure liquid, or most of the pure liquid to the working tank 2 and, from the working tank 2, if desired, to the transportation tanks 6, 8, or a return of the same to the tank T at the site.

Depending upon the manner by which the suction is effected, that is, when the suction is permanently effected from a bottom of the tank T being treated through a sinking surface layer, intermediate phases of sludge and pure liquid or vice versa may occur and, by observing the liquid indicator 20, such intermediate phases can normally be quickly ascertained. When sludge is concerned, the liquid is suctioned or drawn straight into the sludge tank 4. Upon commencement of the suctioning operation or in connection with an intermediate phase pure liquid, a close control is carried out by, for example, applying a pipe or a hose connection 40 between a stub 43 downstream of discharge valve 42 for the liquid from the transfer pump 14 and a top inlet 44 on the sludge tank 4, whereby the use of the pump 14 allows an inspection of the product as the product enters into the sludge tank 4. If necessary, the removal of a test sample or specimen can be carried out so as to enable a quick examination of the sample of specimen. However, it is often necessary for a simple inspection to ascertain whether the liquid is pure or not, that is, whether an oil product contains no water or other relevant impurities and, whether further pumping is necessary for a certain period of time until the liquid being pumped is pure. Until the liquid reaches a complete purity, or at least a sufficient degree of purity for an intended application, the liquid is continuously led into the sludge tank 4.

When the suctioned product meets acceptable purity levels, the suctioning operation is changed so as to be applied to the working tank 2 as described above. If there remains a suspicion that a fraction of the polluted liquid may appear, the liquid indicator 20 may be observed and, if necessary, the liquid may be more closely inspected at certain intervals or even continuously by leading the liquid through the hose 40 to the top inlet 46 of the working tank 2. At the first sign of pollution, the suctioning operation is switched over from the working tank 2 to the sludge tank 4.

When the working tank 2 is completely filled, the contents thereof can be transferred to a transportation tank 6 or 8, whereupon, the operation can then continue.

After suctioning of polluted contents of the tank T which, according to the invention, immediately can be separated into a sludge fraction and a reusable fraction, it can be relevant to carry out a flushing of the emptied tank. This can be effected by leading clean liquid through a pressure hose from one of the transportation tanks 6 or 8 down to an inlet pipe stub on the tank, optionally to a special cleaning ball installed in this, whereafter the tank is flushed while flushing liquid is sucked from the bottom to the sludge tank 4. The applied pure liquid can be taken from the previously suctioned pure liquid fraction in one of the tanks 6 or 8, or from a volume of clean liquid carried by the service truck or optionally a special cleaning liquid from the other one of the tanks 6, 8. Having completed the cleaning and the renewed emptying of the tank, the sucked up clean liquid fraction can be returned to the tank from the working tank 2 or from one or the other of the tanks 6, 8, which were in fact used for the temporary collection.

The truck is thus applicable for a variety of specialized jobs within a rather extensive geographical area. Further examples comprise exchanging wrong deliveries, where the truck can deliver correct goods and carry out the exchange all in one visit to the customer in question. By exchanging of tanks the truck can assist by suctioning the remaining contents of the old tank, even in carrying out a pertaining separate suction of its residue sludge, upon which it can wait while the old tank is removed and the new one be installed, and thereafter the usable part of the old tank contents can be transferred to the new tank. The truck can also take loose liquid drums for delivery.

Instead of using the pump 14 for pressing up test liquid through the hose 40 to an inspection area at the top of the sludge tank 4 or the working tank 2, respectively, a sampling device installed in the suction inlet of the tank in question can be used. Such a device may allow reentry of the sample into the suction inlet, thereby enabling the taking out of test samples without polluting the surroundings.

It has been mentioned that when pressing liquid into the transportation tanks 6, 8 it must be ensured that the liquid is free from air, as the flow gauge 16 may otherwise show an incorrect reading. However, as long as the service truck is only delivering to a single user, where the collected pure liquid is to be returned, it will of course be without significance whether the measuring in is correct, if only the measuring out is correct, and in such cases it is without importance if there is air in the liquid pressed into the tank. On the other hand, during normal working days the truck will have to visit several customers and carry out a variety of jobs, and thereby it becomes important that the quantity of clean liquid, which at the individual site be led into the transportation or storage tank 6, be correctly measured. These tanks moreover, have a usual pumping equipment driven by the truck motor.

I claim:

1. A system for receiving and handling polluted liquids contained in container means accommodating stratified liquid of pure and polluted liquids, the system comprising a mobile sewage vehicle having a sludge tank and a working tank, a vacuum pump, means for connecting the vacuum pump with the sludge tank and the working tank, a suction inlet adapted for connection with an external suction conduit to permit suctioning of liquids from a container means through said suction inlet via said external suction conduit, said suction inlet being connected with both said sludge tank and said working tank through suction connection means, valve means in said suction connection means operable to permit a selective suctioning of liquid from said container means through said suction inlet via said external suction conduit into the respective tanks, at least one of liquid sampling and liquid inspection means being provided in said suction connection means, and a liquid pumping means having a suction side connected with said suction inlet and a discharge side connectable with a top inlet of at least one of said sludge tank and working tank through an inspection zone enabling sample taking and also a direct inspection of the liquid delivered by said liquid pumping means.

2. A system according to claim 1, further comprising at least one transportation tank, and wherein the suction side of said liquid pumping means is connectable with a bottom outlet of said working tank and the discharge side of the pumping means is connectable with an inlet of said at least one transportation tank.

3. A system according to claim 2, wherein a flow meter is arranged between the discharge side of said liquid pumping means and the inlet of said at least one transportation tank.

4. A system according to claim 3, wherein the discharge side of the liquid pumping means is connectable with a top of the sludge tank by a hose.

5. A system according to claim 2, wherein the discharge side of the liquid pumping means is selectively connectable with the inlet of said at least one transportation tank and a stub for enabling an external delivery of liquid from the working tank.

6. A method for receiving and handling polluted liquid containing in a container means accommodating stratified liquid of pure and polluted liquids, the method comprising the steps of:

providing a mobile sewage vehicle having a working tank, a sludge tank and a vacuum pump, a suction side of the vacuum pump being selectively connectable with top portions of said working tank and said sludge tank, and lower portions of said tanks being selectively connectable with a suction inlet for connection with an external suction conduit permitting a suctioning in of liquid from said container means through at least one of liquid sampling and liquid inspection means into either of said tanks, a liquid pumping means, the suction side of the liquid pumping means being selectively connectable with the suction inlet and the discharge side of the liquid pumping means being selectively connectable with a top inlet of at least one of the working tank and the sludge tank so as to enable a direct inspection of liquid being delivered by said liquid pumping means, initially suctioning liquid from said container means selectively into the working tank or the sludge tank in dependence upon a condition of the liquid being suctioned as detected by at least one of the liquid sampling means and liquid inspection means, monitoring the suctioned liquid to determine a shift between clean and polluted liquid, shutting off the vacuum pump in response to the occurrence of said shift between clean and polluted liquid and operating said liquid pumping means so as to thereafter effect delivery of the suctioned liquid to the top of the work tank or sludge tank in dependence upon the clean or polluted condition of the suctioned liquid, and re-establishing a suctioning of liquid by the vacuum pump selectively to either the working tank or the sludge tank in dependence upon the condition of subsequently delivered liquid from the container means.

* * * * *